United States Patent
Tung et al.

(10) Patent No.: US 7,188,206 B2
(45) Date of Patent: Mar. 6, 2007

(54) USB COMPOUND DEVICE WITHOUT EMBEDDED HUB AND IMPLEMENT METHOD IN USB SYSTEM

(75) Inventors: Kuo-Jung Tung, Chia-Yi Hsien (TW); Meng-Chow Jiang, Tai-Chung (TW); Yen-Sheng Chien, Taipei Hsien (TW)

(73) Assignee: Conwise Technology Corporation Ltd., HsinChu (TW)

( * ) Notice: Subject to any disclaimer, the term of this patent is extended or adjusted under 35 U.S.C. 154(b) by 167 days.

(21) Appl. No.: 10/904,079

(22) Filed: Oct. 22, 2004

(65) Prior Publication Data

US 2006/0136621 A1 Jun. 22, 2006

(51) Int. Cl.
*G06F 13/00* (2006.01)
(52) U.S. Cl. ...................... 710/302; 710/313
(58) Field of Classification Search ........ 710/300–304, 710/305–306, 312–314
See application file for complete search history.

(56) References Cited

U.S. PATENT DOCUMENTS

| | | | | |
|---|---|---|---|---|
| 5,884,086 A | * | 3/1999 | Amoni et al. ............... 713/300 |
| 6,122,676 A | * | 9/2000 | Brief et al. ..................... 710/9 |
| 6,157,975 A | * | 12/2000 | Brief et al. ................. 710/104 |
| 6,230,226 B1 | * | 5/2001 | Hu et al. ..................... 710/305 |
| 6,353,866 B1 | * | 3/2002 | Fensore et al. ............. 710/104 |
| 6,408,351 B1 | * | 6/2002 | Hamdi et al. ................. 710/63 |
| 6,862,643 B2 | * | 3/2005 | Wu et al. .................... 710/302 |
| 6,912,651 B1 | * | 6/2005 | Hamdi et al. ................... 713/1 |
| 7,043,575 B2 | * | 5/2006 | Stephan ....................... 710/36 |

* cited by examiner

*Primary Examiner*—Paul R. Myers
(74) *Attorney, Agent, or Firm*—Winston Hsu

(57) ABSTRACT

A USB system includes at least one USB hub, a USB Compound Device, and at least one USB dummy device which is connected to a downstream port of the USB hub. The USB compound device includes an upstream port, a plurality of USB devices and a control unit for setting the states of the plurality of USB devices, wherein when the state of one of the plurality of USB devices is 'on' and the USB device has not been assigned an address, the USB device is capable of setting its address according to a received assigning address packet.

8 Claims, 7 Drawing Sheets

US 7,188,206 B2

USB COMPOUND DEVICE WITHOUT EMBEDDED HUB AND IMPLEMENT METHOD IN USB SYSTEM

BACKGROUND OF INVENTION

1. Field of the Invention

The present invention relates to a USB compound device, a USB system including the present USB compound device, and a related method; and more particularly, to a USB compound device utilizing a plurality of USB dummy devices for initializing a plurality of USB devices of the USB compound device, and also to a USB system including the said USB compound device and a related method.

2. Description of the Prior Art

Universal Serial Bus (USB) is a very common computer interface specification. Usually a personal computer (PC) provides at least one standard USB port. Any peripheral device that implements the USB standard can connect to a PC equipped with a USB port and transmit/receive data through the USB port. With the ease of use provided by plug-and-play, and the high transmission speed, devices using the USB standard interface are now in the mainstream. USB flash memory cards for digital cameras and USB hard disks are just two examples. Usually, USB devices can only be initialized correctly by a USB system when connecting to a downstream port of a USB hub on a one-to-one basis. There are some USB compound devices on the market. These USB compound devices comprise at least two USB devices within them. For example, a USB input device may comprise a keyboard and a trackball. A conventional USB compound device must includes a USB hub such that the plurality of USB devices of the USB compound device can operate correctly.

Please refer to FIG. 1. FIG. 1 is a block diagram of a prior art USB system 100 including a USB compound device 120. The USB system 100 includes a USB host 110, a USB hub 160, and a conventional USB compound device 120. The USB hub 160 comprises an upstream port 162, a first downstream port 1641 and a second downstream port 1642. The USB compound device 120 comprises a USB hub 130 and two USB devices 140 and 150. The function and structure of the USB hub 130 is the same as a common USB hub. The embedded USB hub 130 includes an upstream port 132 and a plurality of downstream ports. In the example illustrated in FIG. 1, there are a first downstream port 1341 and a second downstream port 1342 in the embedded USB hub 130. The two downstream ports 1341 and 1342 of the USB hub 130 connect to the two upstream ports 142 and 152 of the USB devices 140 and 150 respectively within the USB compound device 120, and the whole USB compound device 120 connects to the USB system 100 by connecting the downstream port 1641 of the USB hub 160 with its upstream port 132. In the USB system 100 illustrated in FIG. 1, although the USB host 110 can directly connect to the embedded USB hub 130 of the USB compound device 120 instead of connecting the individual USB hub 160 first, common USB hosts such as PCs are all equipped with a USB root hub. Therefore, the USB system 100 illustrated in FIG. 1 still comprises a USB hub 160.

Please refer to FIG. 2. FIG. 2 is a flowchart of a conventional USB host initializing a USB compound device. The prior art USB system 100 and its components illustrated in FIG. 1 are utilized to demonstrate the flow of initialization in FIG. 2.

Step 200: Start;
Step 202: USB host 110 detects an unset device 160;
Step 204: USB host 110 initializes USB hub 160 and gets information;
Step 206: USB hub 160 detects an unset device 130 connected to the first downstream port 1641;
Step 208: USB host 110 queries USB hub 160 and gets downstream port status-change information;
Step 210: USB host 110 initializes USB hub 130 and gets information;
Step 212: USB hub 130 detects an unset device 140 connected to the first downstream port 1341;
Step 214: USB host 110 queries USB hub 130 and gets downstream port status-change information;
Step 216: USB host 110 initializes USB device 140 and gets information about USB device 140; USB host 110 assigns a unique address to USB device 140;
Sep 218: USB hub 130 detects an unset device 150 connected to the second downstream port 1342;
Step 220: USB host 110 queries USB hub 130 and gets downstream port status-change information;
Step 222: USB host 110 initializes USB device 150 and gets information; USB host 110 assigns a unique address to USB device 150;
Step 224: End.

It can be seen in the flowchart illustrated in FIG. 2 that the conventional USB compound device must comprise an embedded USB hub for each of the plurality of USB devices of the USB compound device to be initialized and assigned an address by the USB host correctly, and for the USB host to control the plurality of USB devices of the USB compound device properly. However, the requirement of an embedded USB hub raises the complexity of the structure of the USB compound device, and the cost of the conventional USB compound device increases in consequence.

SUMMARY OF INVENTION

It is therefore a primary objective of the claimed invention to provide a USB compound device, a USB system including a said USB compound device, and a related controlling method for initializing a plurality of USB devices of the USB compound device by utilizing a plurality of USB dummy devices.

Briefly described, the claimed invention discloses a Universal Serial Bus (USB) system. The USB system includes at least one USB hub, a USB compound device, and a fourth number of USB dummy devices. Each USB hub includes an upstream port and a plurality of downstream ports, and the USB hub comprises a first number of downstream ports in total. The USB compound device includes an upstream port for connecting a first downstream port among the first number of downstream ports of the USB hub, a second number of USB devices, and a control unit capable of setting the states of the second number of USB devices, wherein the second number is not greater than the first number. A state of each USB device of the second number of USB devices is set to an on state in turn according to a predetermined rule, and when a state of one USB device of the second number of USB devices is set to the on state and the USB device is not assigned an address, the USB device is capable of setting its address according to an address assigning package received from the upstream port of the USB compound device. Among the first number of downstream ports of the USB hub, there are a third number of downstream ports prior to the first downstream port, in which the third number is not less than the second number minus one. The fourth number of USB dummy devices are connected to a fourth number of downstream ports among the first number of downstream ports of the USB hub, in which the fourth number of downstream ports are subsequent to the first downstream port, wherein each USB dummy device is capable of providing a connection event to a USB hub when connecting to a downstream port of the USB hub, in which the fourth number is the second number minus one.

The claimed invention further discloses a USB compound device. The USB compound device includes an upstream port for connecting a downstream port of a USB hub, a plurality of USB devices, and a control unit capable of setting states of the plurality of USB devices. A state of each USB device of the plurality of USB devices is set to an on state in turn according to a predetermined rule, and when a state of one USB device of the plurality of USB devices is set to the on state and the USB device is not assigned an address, the USB device is capable of setting its address according to an address assigning package received from the upstream port of the USB compound device.

The claimed invention additionally discloses a method for setting an address of a USB compound device. The method includes detecting an unset USB compound device connecting to a downstream port, initializing the detected USB compound device and assigning an address to the detected USB compound device, assigning the address assigned to the USB compound device to a first USB device of the USB compound device, setting a state of a USB device to an on state, said USB device which is not assigned an address according to a predetermined rule, detecting an unset USB dummy device connected to a downstream port, initializing the detected USB dummy device and assigning an address to the detected USB dummy device, and assigning the address assigned to the USB dummy device to an unset USB device of the USB compound device.

It is an advantage of the present invention that the USB compound device that includes a plurality of USB devices utilizes a plurality of USB dummy devices for initializing the plurality of USB devices. Hence the present invention USB compound device does not have to be equipped with an embedded USB hub. Therefore the structure is simplified.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
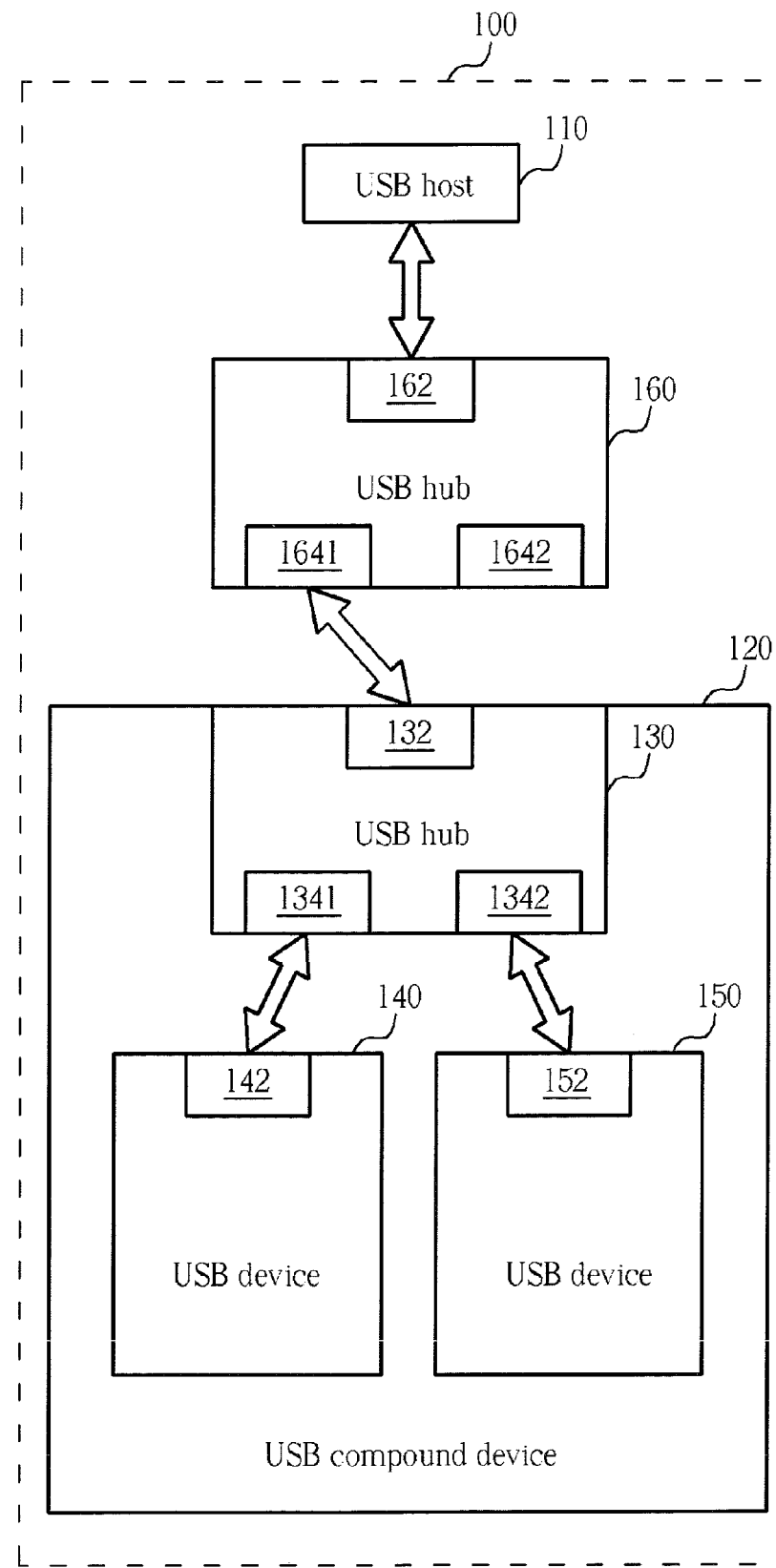
FIG. 1 is a block diagram of a prior art USB system including a prior art USB compound device.
Figure 2:
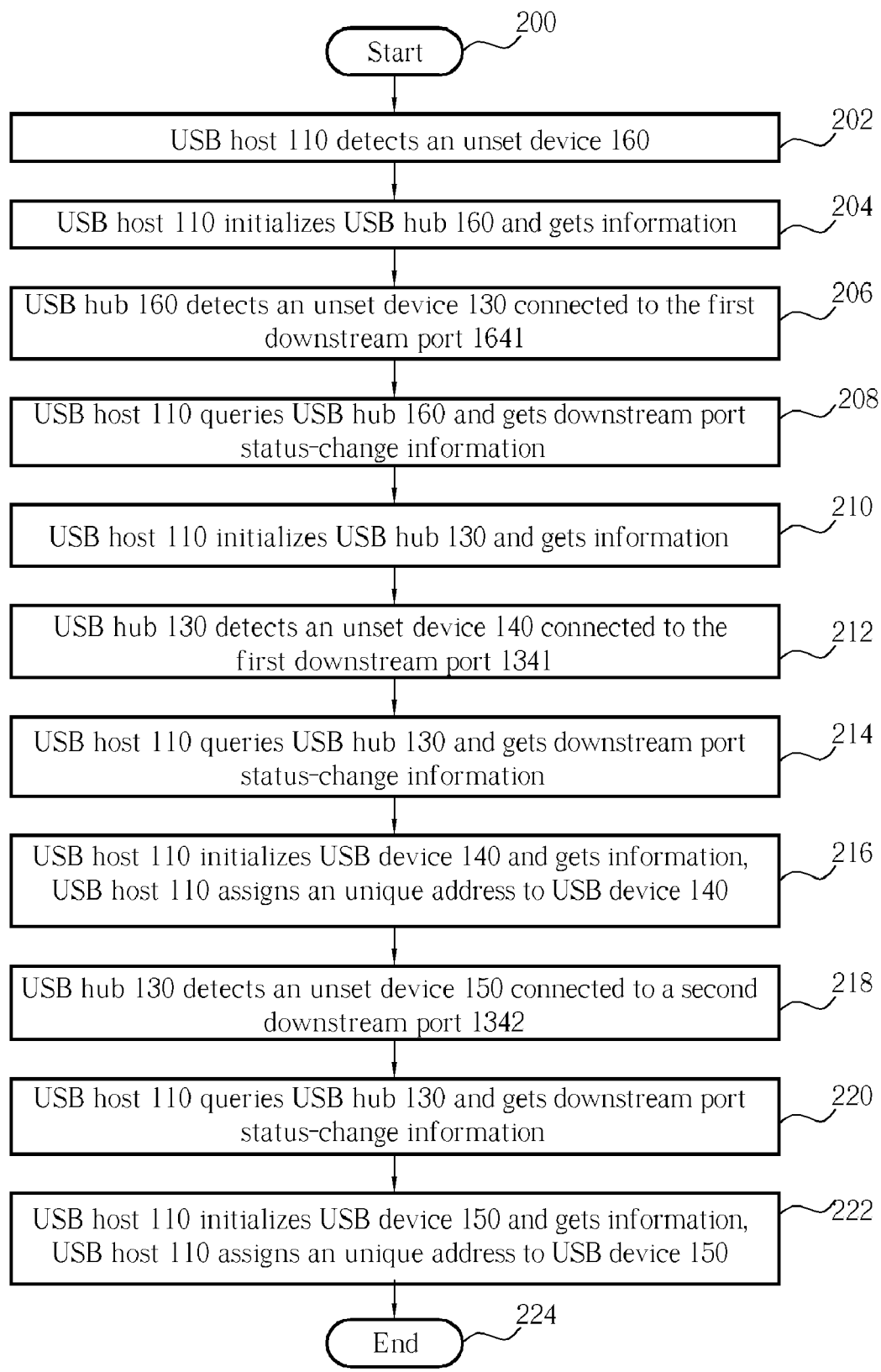
FIG. 2 is a flowchart of a prior art method for a USB host initializing a USB compound device.
Figure 3:
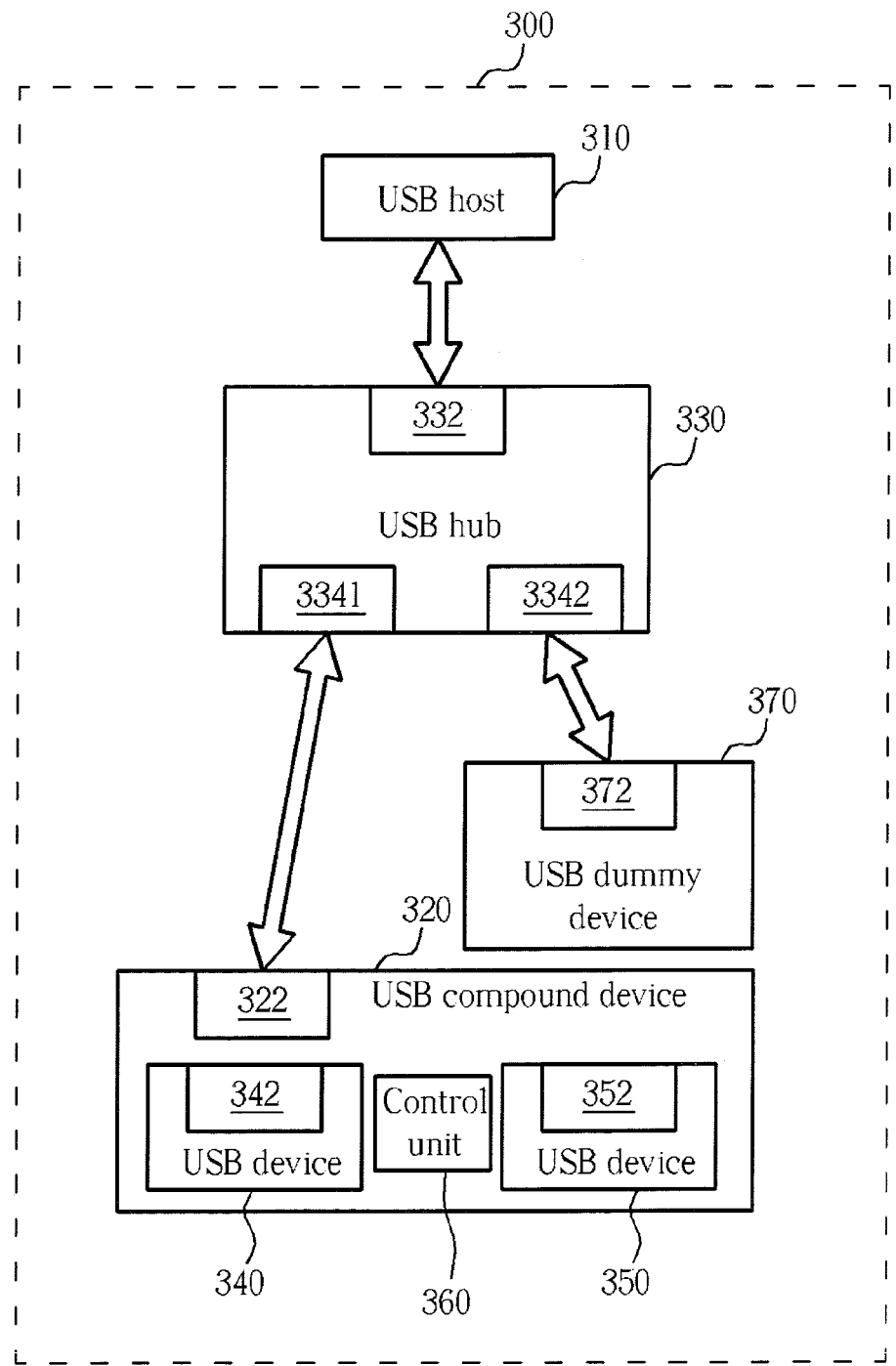
FIG. 3 is a block diagram of the present invention USB system.

Please refer to FIG. 3. FIG. 3 is a block diagram of the present invention USB system 300 including a USB compound device 320. The USB system 300 includes a USB host 310, a USB hub 330, a claimed USB compound device 320 and a USB dummy device 370. The USB hub 330 comprises an upstream port 332, a first downstream port 3341 and a second downstream port 3342. The USB compound device 320 comprises an upstream port 322, two USB devices 340 and 350, and a control unit 360. The USB dummy device 370 comprises an upstream port 372 and has no practical function. As illustrated in FIG. 3, the upstream port 322 of the USB compound device 320 connects to the first downstream port 3341 of the USB hub 330, and the upstream port 372 of the USB dummy device 370 connects to another downstream port 3342 of the USB hub 330. The two USB devices 340 and 350 of the USB compound device 320 can receive signals sent from the USB host 310 to the upstream port 322 of the USB compound device 320 through the USB hub 330. The control unit 360 is utilized to set states of the two USB devices 340 and 350. When the USB dummy device 370 connects to a downstream port of a USB hub, the USB dummy device 370 provides a connection event to the USB hub, which means the USB host can detect the connected USB dummy device but the USB dummy device does not really function practically at all. Since the claimed USB compound device 320 is not equipped with an embedded USB hub, the USB host 310 does not query the USB compound device 320 to detect whether there is any USB device connected to the downstream ports of the USB compound device 320 when detecting the existence of the USB compound device 320, but directly initializes and assigns a unique address to the USB compound device 320. After the initialization of the USB compound device 320, the USB host 310 continuously detects and initializes the USB dummy device 370 that connects to the following downstream port 3342 of the USB hub 330. According to the claimed invention, the first USB device 340 of the USB compound device 320 receives signals sent from the USB host 310 through the USB hub 330 to the USB compound device 320, and sets its address according to the address that the USB host 310 assigned to the USB compound device 320. Since the USB system is a broadcasting system and each device in the USB system is able to receive every signal sent out from the USB host, the second USB device 350 can also receive signals sent from the USB host 310 through the USB hub 330 to the USB compound device 320. The control unit 360 of the USB compound device 320 is in charge of switching states of USB devices of the USB compound device 320. The state of the second USB device 350 is set to an on state after the address assignment of the first USB device 340 by the control unit 360. When the state of the second USB device 350 is set to the on state, the second USB device 350 receives the address that the USB host 310 assigns to the USB dummy device 370 and sets its address according to the address that the USB host 310 assigns to the USB dummy device 370. Afterwards, whenever the USB host 310 communicates with the USB compound device 320, the first USB device 340 of the USB compound device 320 replies according to the address dictated by the packets, that is, the address which the USB host 310 assigned to the USB compound device 320 and which the first USB device 340 set as its address; and whenever the USB host 310 communicates with the USB dummy device 370, the second USB device 350 of the USB compound device 320 replies according to the address dictated by the packets, that is, the address which the USB host 310 assigned to the USB dummy device 370 and which the second USB device 350 set as its address. Therefore, the claimed USB compound device 320 is capable of correctly controlling and communicating with each USB device of the USB compound device 320 without an embedded USB hub.

Figure 4:
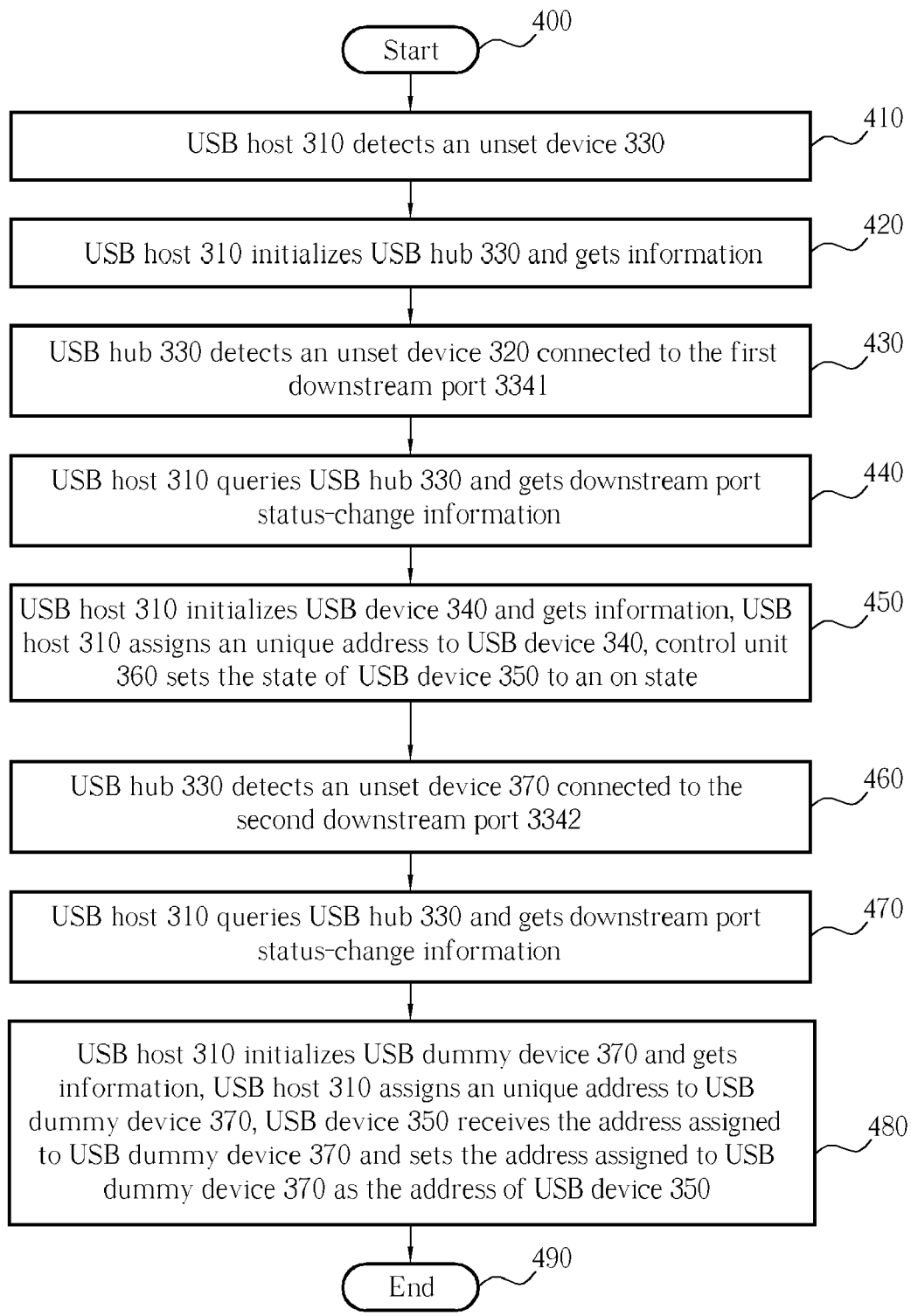
FIG. 4 is a flowchart of the present invention method for a USB host to initialize a USB compound device.

Please refer to FIG. 4. FIG. 4 is a flowchart of the present invention USB host when initializing a USB compound device. The claimed USB system 300 and its components illustrated in FIG. 3 are used to demonstrate the flow of initialization in FIG. 4.

Step 400: Start;

Step 410: USB host 310 detects an unset device 330;

Step 420: USB host 310 initializes USB hub 330 and gets information;

Step 430: USB hub 330 detects an unset device 320 connected to the first downstream port 3341;

Step 440: USB host 310 queries USB hub 330 and gets the downstream port status-change information;

Step 450: USB host 310 initializes USB device 340 and gets information; USB host 310 assigns a unique address to USB device 340; control unit 360 sets the state of the USB device 350 to an on state;

Step 460: USB hub 330 detects an unset device 370 connected to the second downstream port 3342;

Step 470: USB host 310 queries USB hub 330 and gets the downstream port status-change information;

Step 480: USB host 310 initializes USB dummy device 370 and gets information; USB host 310 assigns a unique address to USB dummy device 370; USB device 350 receives the address assigned to USB dummy device 370 and sets the address assigned to USB dummy device 370 as the address of itself;

Step 490: End.

As illustrated in the flow of FIG. 4, the claimed USB compound device does not need to be equipped with an embedded USB hub. An external USB dummy device located in the same layer as the claimed USB compound device is utilized such that the USB host can correctly initialize and control the second USB device of the claimed USB compound device according to the address that is originally assigned to the USB dummy device.

The present USB compound device may comprise a plurality of USB devices without an embedded USB hub. A USB system that utilizes the present USB compound device needs to comprise USB dummy devices of a number that is at least the number of the USB devices of the USB compound device minus one. Theses USB dummy devices are connected to downstream ports of a USB hub which is in the same layer as that of the USB hub that the USB compound device is connected to, and the downstream ports that the USB dummy devices are connected to are subsequent to the downstream port that the USB compound device is connected to.

Figure 5:
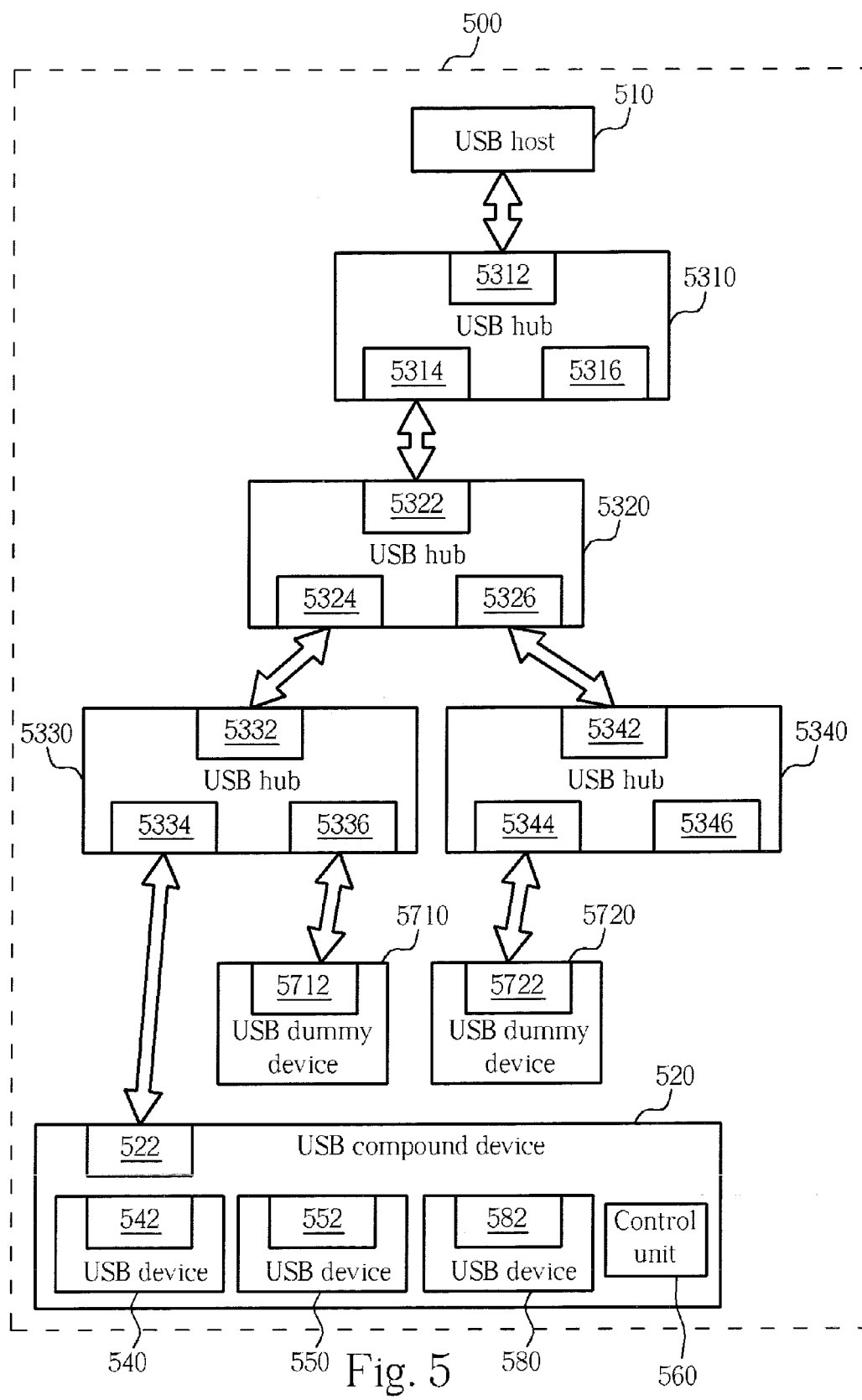
FIG. 5 is a block diagram of another embodiment of the present invention USB system.

Please refer to FIG. 5. FIG. 5 is a block diagram of another embodiment of the present invention USB system. A USB system 500 comprises a USB host 510. There are four USB hubs 5310, 5320, 5330 and 5340, and 5312, 5322, 5332 and 5342 are upstream ports of the four USB hubs 5310, 5320, 5330 and 5340 respectively. The four USB hubs 5310, 5320, 5330 and 5340 respectively comprise downstream ports 5314 and 5316, 5324 and 5326, 5334 and 5336, 5344 and 5346. The claimed USB compound device 520 comprises an upstream port 522, three USB devices 540, 550 and 580, and a control unit 560. Two USB dummy devices 5710 and 5720 respectively comprise upstream ports 5712 and 5722, and the two dummy devices are connected to a second downstream port 5336 of the USB hub 5330 and a first downstream port 5344 of the USB hub 5340. As demonstrated in FIG. 5, the upstream port 522 of the claimed USB compound device 520 is connected to the first downstream port 5334 of the USB hub 5330, and the USB dummy devices 5710 and 5720 are located in the same layer in the USB system 500. In the USB compound device 520, three USB devices 540, 550 and 580 all can receive signals sent from the USB host 510 through the USB hubs 5310, 5320, 5330 to the upstream port 522 of the compound device 520, and the control unit 560 is in charge of setting states of the three USB devices 540, 550, and 580 according to a predetermined rule. When the USB host 510 detects the USB compound device 520, it does not query the USB compound device 520 about downstream port information since the USB compound device 520 does not comprise a USB hub, but directly initializes the USB compound device 520 and assigns an address to the USB compound device 520. The first USB device 540 of the USB compound device 520 receives signals from the USB host 510 through the upstream port 542, and sets its address according to the address that the USB host 510 assigns to the USB compound device 520. The second USB device 550 and the third USB device 580 receive signals from the USB host 510 through their upstream ports 552 and 582 respectively as well. However, the states of the second USB device 550 and the third USB device 580 are set to off states before the address of the first USB device 540 is assigned. Therefore the second USB device 550 and the third USB device 580 will not take the address that the USB host 510 assigns to the USB compound device 520 as their address. The control unit 560 manages the switching of the states of the USB devices of the USB compound device 520. According to the predetermined rule, the control unit 560 sets the state of the second USB device 550 to an on state and leaves the third USB device 580 in the off state after the address assignment of the first USB device 540 is accomplished. The USB host 510 starts to initialize the USB dummy device 5710 connected to the subsequent downstream port 5336 after the initialization of the USB compound device 520. At the same time, the second USB device 550, which is in an on state, sets its address according to the address that the USB host 510 assigns to the USB dummy device 5710. Similarly, according to the predetermined rule, the control unit 560 sets the state of the third USB device 580 to an on state after the address assignment of the second USB device 550 is accomplished, and the USB host 510 starts to initialize the USB dummy device 5720 connected to the subsequent downstream port 5344 after the initialization of the USB dummy device 5710. Simultaneously, the third USB device 580, already in an on state, sets its address according to the address that the USB host 510 assigns to the USB dummy device 5720. Henceforth, whenever the USB host 510 is supposed to communicate with the USB compound device 520, the first USB device 540 of the USB compound device 520 replies according to the address dictated in signals, that is, the address the USB host 510 assigned to the USB compound device 520 and the USB device 540 set as its address. Whenever the USB host 510 communicates with the USB dummy device 5710, the second USB device 550 of the USB compound device 520 replies according to the address dictated in signals, that is, the address the USB host 510 assigned to the USB dummy device 5710 and the USB device 550 set as its address. And whenever the USB host 510 communicates with the USB dummy device 5720, the third USB device 580 of the USB compound device 520 replies according to the address dictated in signals, that is, the address the USB host 510 assigned to the USB dummy device 5720 and the USB device 580 set as its address. It is seen from the illustration in FIG. 5 and the above description that in the present invention, the USB host 510 is capable of controlling the USB compound device 520 and related USB devices by utilizing USB dummy devices 5710 and 5720 which are installed in the same layer as the USB compound device 520, wherein the claimed USB compound device 520 is not equipped with an embedded USB hub. Furthermore, according to the rule of the USB specification for processing devices connected to downstream ports, for proper operation, these USB dummy devices must connect to downstream ports in the same layer as the downstream port that connects the USB compound device 520 and subsequent to the downstream port that connects the USB compound device 520.

Figure 6:
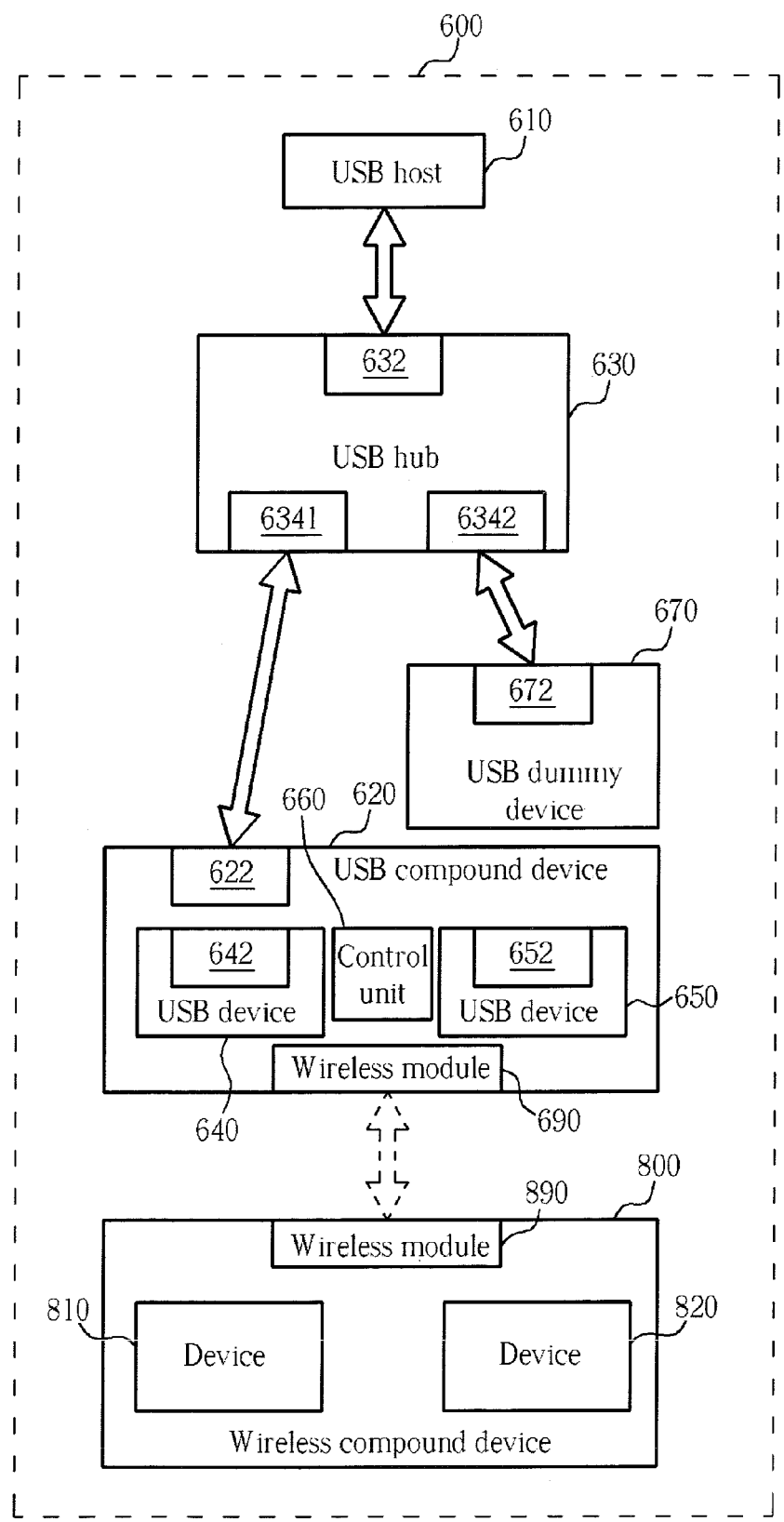
FIG. 6 is a block diagram of a USB system comprising a USB compound device with a wireless communication module.

With the progress of wireless technology, it is common to utilize radio frequency (RF) modules for connecting to the USB system wirelessly. However, the cost of wireless communication modules is still high. Hence connecting or embedding a wireless communication module with the claimed USB compound device may help to reduce the number of wireless communication modules that are needed in the whole USB system. Please refer to FIG. 6. FIG. 6 is a block diagram of a USB system 600 that comprises a USB compound device 620 including a wireless communication module 690. USB system 600 comprises a USB host 610, and a USB hub 630. The USB hub 630 comprises an upstream USB port 632, a first downstream USB port 6341 and a second downstream port 6342. The present invention USB compound device 620 comprises an upstream port 622, two USB devices 640 and 650, a control unit 660, and a wireless communication module 690. 670 is a USB dummy device. 800 is a wireless compound device comprising a wireless communication module 890, and two devices 810 and 820. In the USB system 600, the method for the USB host 610 to detect and initialize the USB hub 630, the USB compound device 620, and the USB dummy device 670, is the same method as the aforementioned USB host 310 uses to detect and initialize the USB hub 330, the USB compound device 320, and the USB dummy device 370. In FIG. 6, when the USB compound device 620 receives signals sent from the USB host 610 to the USB devices 640 and 650 (actually, they are signals sent from the USB host 610 to the USB compound device 620 and the USB dummy device 670), the USB compound device 620 transmits the signals wirelessly to the wireless communication module 890 of the wireless compound device 800 through the wireless communication module 690. The wireless compound device 800 demodulates out a USB signal when receiving the wireless signals, and controls devices 810 and 820 accordingly. When the devices 810 and 820 of the wireless compound device 800 communicate to the USB host 610, signals are sent out wirelessly by the wireless communication module 890 to the wireless communication module 690 of the USB compound device 620, and the wireless communication module 690 demodulates the received wireless signals to USB signals. The USB compound device 620 then controls its USB devices 640 and 650 to transmit the demodulated signals to the USB host 610 according to the demodulated signals. It is apparent to those skilled in the art that the claimed USB compound device 620 can help wireless compound devices such as the wireless compound device 800 reduce the number of necessary wireless communication modules. In FIG. 6, although the wireless compound device 800 comprises a plurality of devices, it only needs a single wireless communication module to communicate with the wireless communication module of the claimed USB compound device 620 for connecting to the USB system 600.

Figure 7:
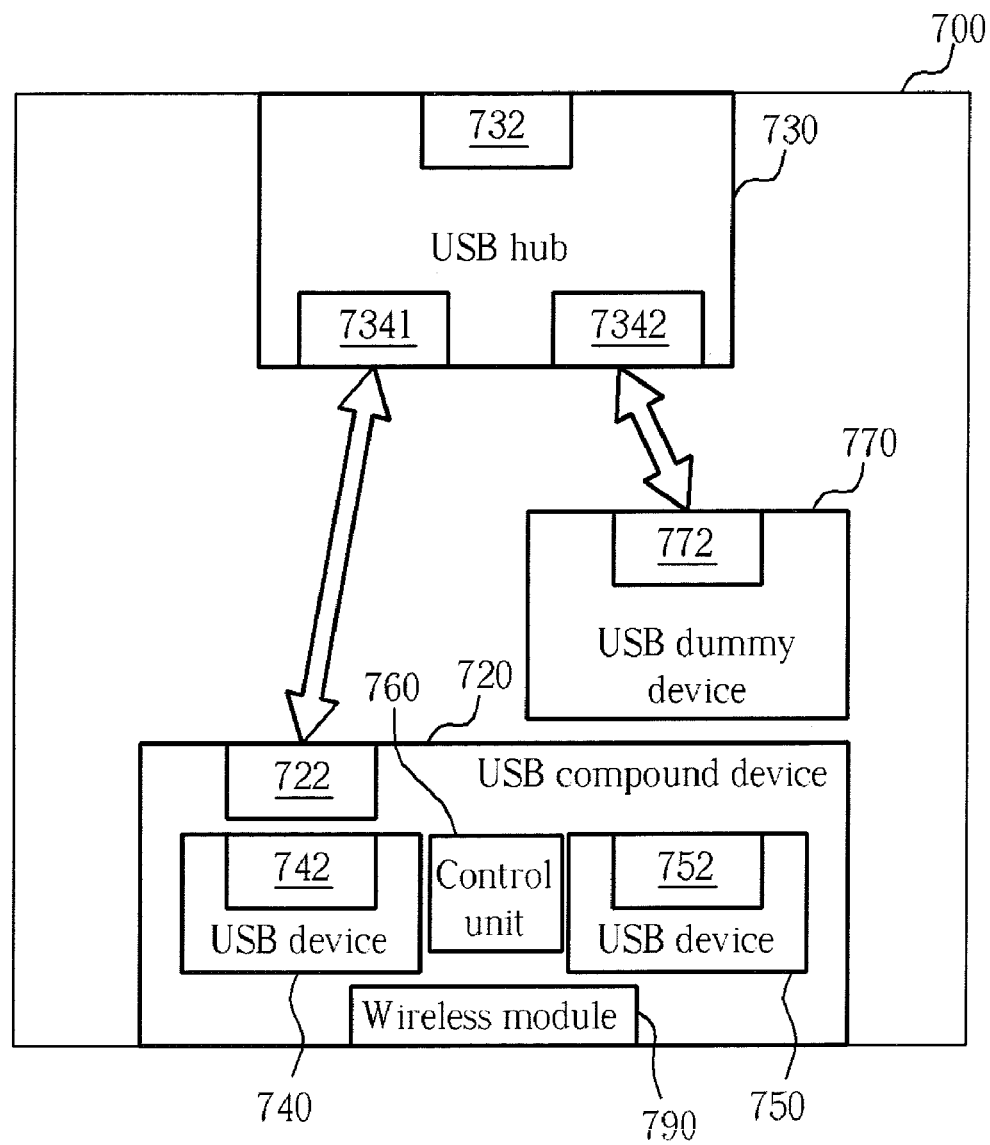
FIG. 7 is a block diagram of a present invention USB wireless compound device.

As demonstrated in FIG. 6, the claimed USB compound device 620 with a single wireless communication module 690 accompanied with a USB dummy device 670 reduces the needs of the wireless compound device 800 to require only a single wireless communication module 890 for wirelessly connecting to the USB system 600. The USB compound device 620 and the wireless compound device 800 may utilize radio frequency, infrared, or other wireless technologies. The present USB compound device with a single wireless communication module can be combined with a USB hub and a USB dummy device for the convenience of users. Please refer to FIG. 7. FIG. 7 is a block diagram of a present invention USB wireless compound device 700 comprising a claimed USB compound device 720 with a wireless communication module 790, a USB dummy device 770, and a USB hub 730. The USB hub 730 comprises an upstream port 732, a first downstream port 7341, and a second downstream port 7342. The present USB compound device 720 comprises a wireless communication module 790, an upstream port 722, two USB devices 740 and 750, and a control unit 760. When making use of a wireless compound device, the USB compound device 700 can be connected to a downstream port of a USB system, such that the USB system can wirelessly connect to the wireless compound device through the present USB compound device 700. As illustrated in FIG. 7, the use of the claimed USB compound device 700 can simplify the structure of the whole USB system. With the present USB compound device 700, users do not need to manually connect USB dummy devices externally, instead using the wireless connection easily and quickly. For example, a game pad comprising a vocal communication device and a memory card is a compound device in essence. A USB compound device like the present USB compound device 700 illustrated in FIG. 7 can help to make the game pad a wireless one. Players can connect and control the game pad wirelessly by connecting a USB compound device 700 to the USB system with the embedded wireless module 790 of the USB compound device 700. RF wireless interface standards, such as Bluetooth and WLAN, or other wireless means such as infrared rays, can be used in all wireless communication modules in the USB systems in FIG. 6 and FIG. 7.

Compared with conventional USB compound devices, the present USB compound device is not equipped with an embedded USB hub, and uses a control unit to set the states of a plurality of USB devices of the USB compound device. The control unit sets the state of each USB device of the plurality of USB devices to an on state in turn according to a predetermined rule, such that when a state of one of the USB devices is set to an on state but the USB device has not been assigned an address, the USB device can set its address according to a address assigning packet received from the upstream port of the USB compound device. By using USB dummy devices that are installed in the same layer as the USB compound device, the present invention enables the plurality of USB devices of the USB compound device to set their addresses in turn according to the addresses that the USB host assigns to the USB dummy devices. According to the detection and setting rule of a USB system, in the claimed invention, the USB dummy devices have to connect to the downstream ports in the same layer as the downstream port that the present USB compound device connects to in order to perform the present control method correctly. The claimed USB compound device can be expanded further to comprise a wireless communication module, such that a compound device can wirelessly connect to a USB system through a single wireless communication module.

In summary, the present invention provides a USB compound device without an embedded USB hub. USB dummy devices installed in the same layer as the USB compound device are utilized to allow the USB host to set and communicate with each USB device of the USB compound device. The present USB compound device successfully simplifies the structure of USB compound devices, and the cost of USB compound devices is decreased in consequence. Therefore the application of USB compound devices can be spread further. For example, designs of USB input devices comprising a USB track ball and a USB keyboard, wireless compound devices, or USB game control devices can all be simplified, which is favorable for their development.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A Universal Serial Bus (USB) system comprising:
    a group of USB hubs, comprising at least one USB hub, wherein each USB hub comprises:
        an upstream port; and
        a plurality of downstream ports;
    wherein the group of USB hubs is installed in the same layer in the USB system, and the group of USB hubs comprises a first number of downstream ports in total;
    a USB compound device comprising:
        an upstream port for connecting a first downstream port among the first number of downstream ports of the group of USB hubs;
        a second number of USB devices, wherein the second number is not greater than the first number; and
        a control unit capable of setting states of the second number of USB devices, wherein a state of each USB device of the second number of USB devices is set to an on state in turn according to a predetermined rule, and when a state of one USB device of the second number of USB devices is set to the on state and the USB device is not assigned an address, the USB device is capable of setting its address according to an address assigning packet received from the upstream port of the USB compound device;
    wherein among the first number of downstream ports of the group of USB hubs, there are a third number of downstream ports prior to the first downstream port, in which the third number is not less than the second number minus one; and
    a fourth number of USB dummy devices connecting to a fourth number of downstream ports among the first number of downstream ports of the group of USB hubs, in which the fourth number of downstream ports are subsequent to the first downstream port, wherein each USB dummy device is capable of providing a connection event to a USB hub when connecting to a downstream port of the USB hub, in which the fourth number is the second number minus one.

2. The USB system of claim 1 wherein the second number of USB devices of the USB compound device comprise a USB keyboard and a USB trackball.

3. The USB system of claim 1 wherein the first number is 2, the second number is 2, the third number is 1, and the fourth number is 1.

4. The USB system of claim 1 wherein the USB compound device is a USB game control device.

5. The USB system of claim 1 wherein the second number of USB devices of the USB compound device comprise a USB memory card and a USB communication device.

6. The USB system of claim 1 wherein the second number of USB devices of the USB compound device comprise a USB game pad and a USB communication device.

7. The USB system of claim 1 wherein the USB compound device further comprises a wireless communication module for connecting a device wirelessly.

8. The USB system of claim 7 wherein the wireless communication module is a radio frequency (RF) communication module capable of transmitting and/or receiving RF signals.

* * * * *